March 2, 1943.  A. A. JENS  2,312,415
METHOD OF WELDING THE ENDS OF SUPPORTING
RODS TO END FITTINGS OF WELL SCREENS
Filed Oct. 12, 1940   3 Sheets-Sheet 1
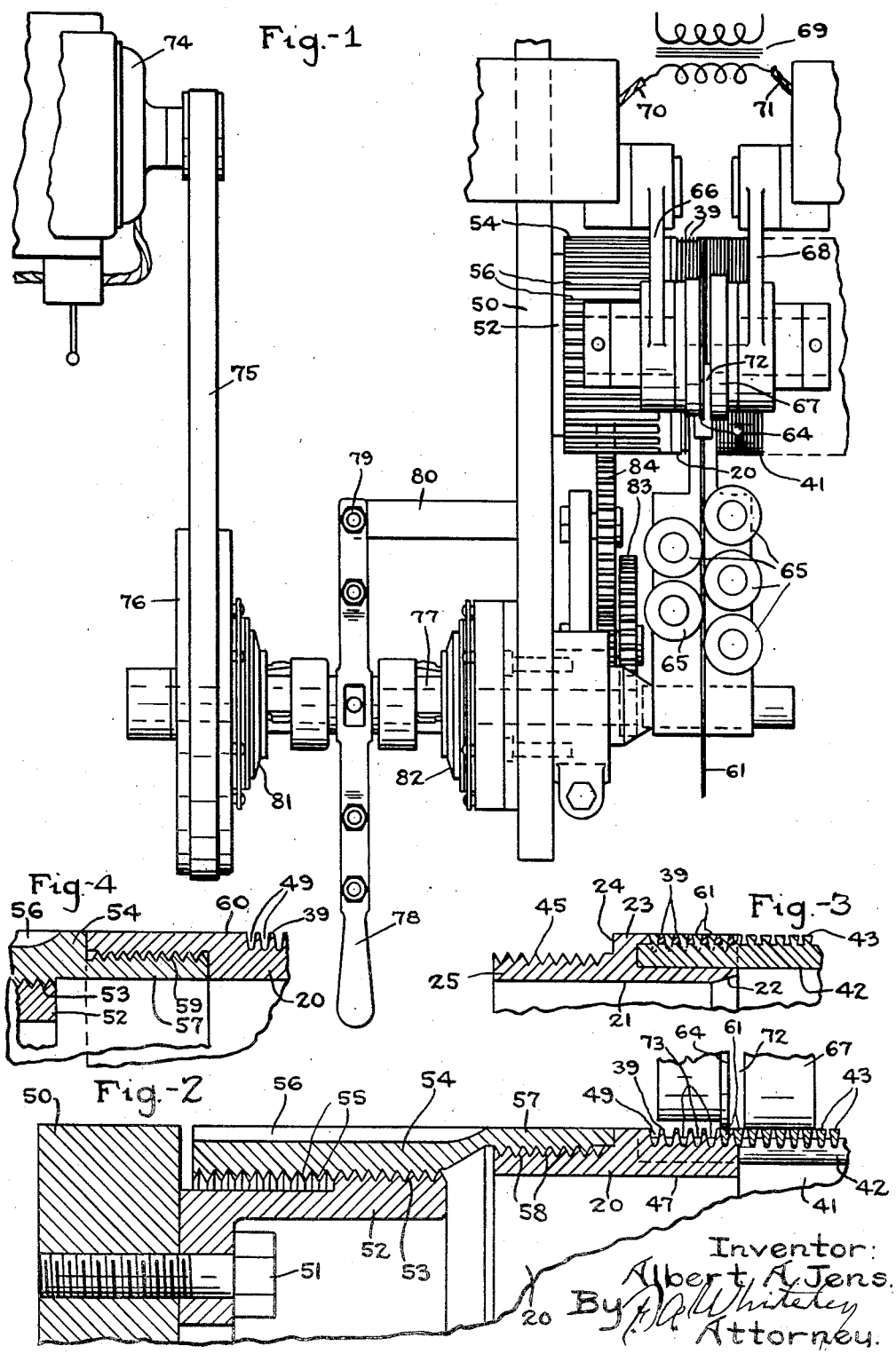

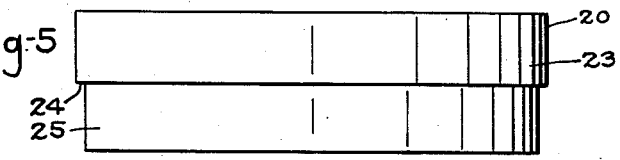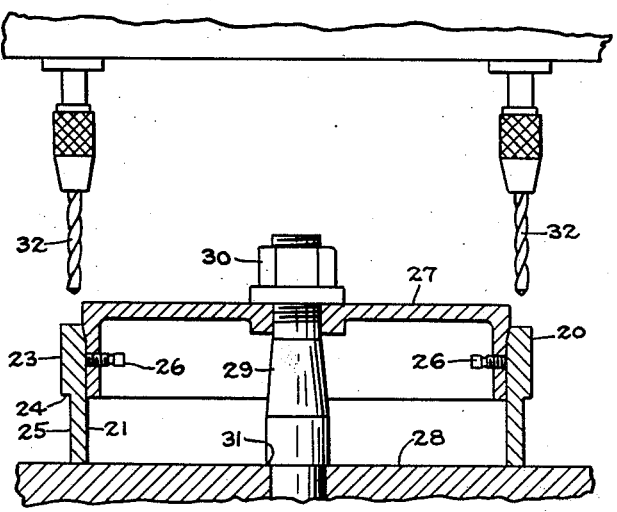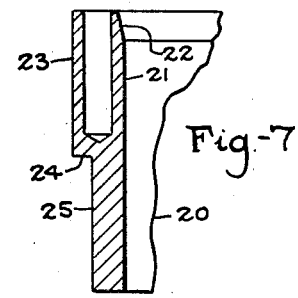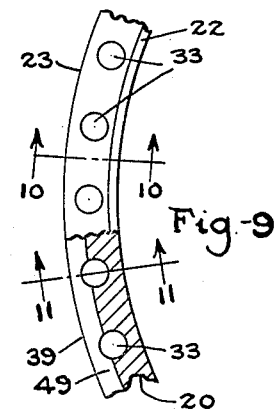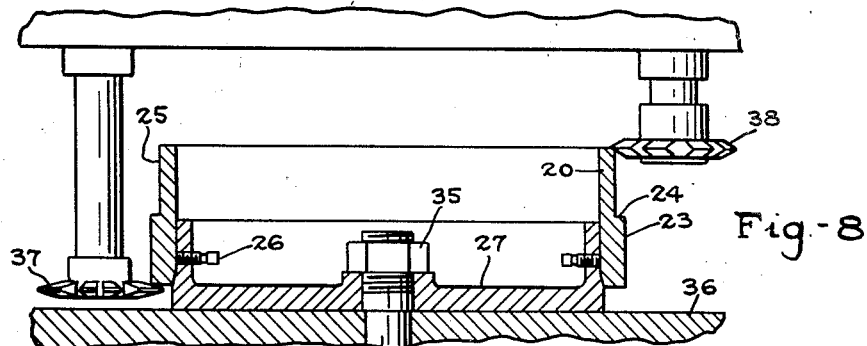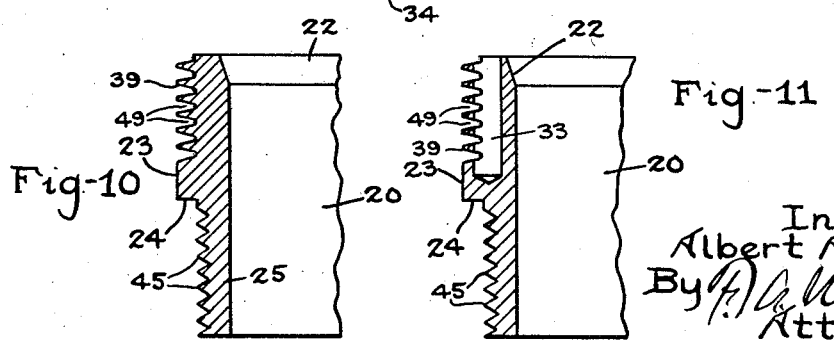

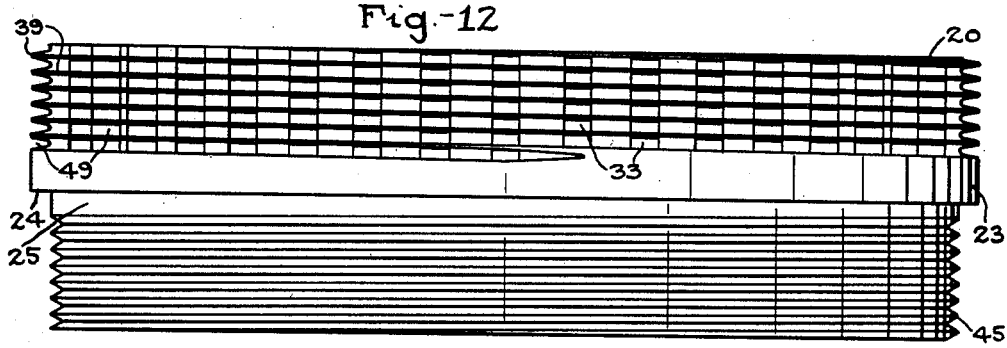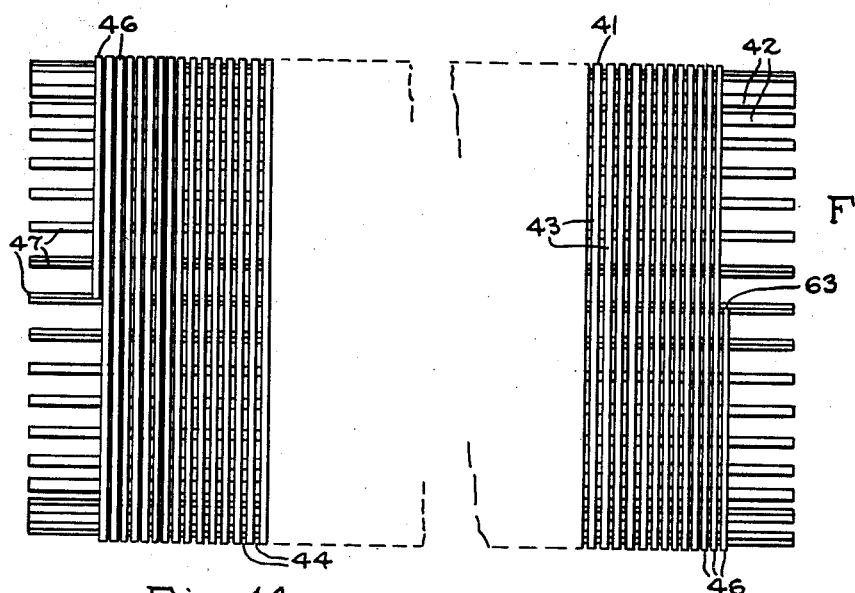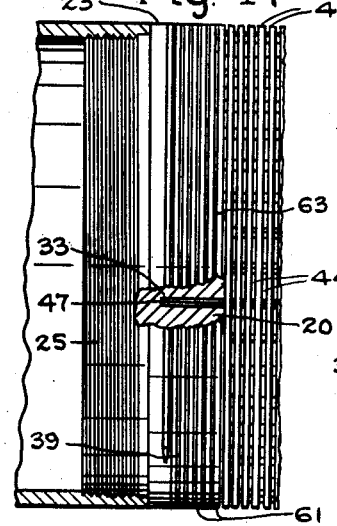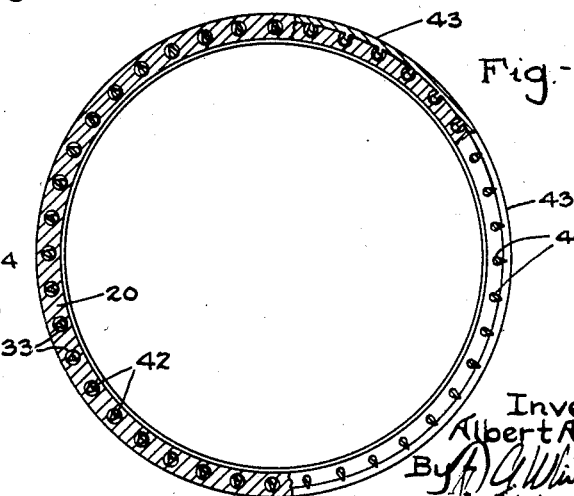

Patented Mar. 2, 1943

2,312,415

UNITED STATES PATENT OFFICE 2,312,415

METHOD OF WELDING THE ENDS OF SUPPORTING RODS TO END FITTINGS OF WELL SCREENS

Albert A. Jens, St. Paul, Minn., assignor to Edward E. Johnson, Incorporated, St. Paul, Minn.

Application October 12, 1940, Serial No. 360,968

4 Claims. (Cl. 29—163.5)

My invention relates to method of welding the ends of supporting rods of well screens to end fittings, and has for its object to provide a method whereby in the case of well screens formed of a wrapping wire laid over and secured upon a series of longitudinal supporting members, the end fittings of the screen are welded directly to the extended ends of said rods.

It is a well known practice in the manufacture of well screens to support a series of rods so that their outer limits will outline a cylinder and wind in a helix upon said cylinder of rods a wrapping wire spaced so as to provide drainage slots and to secure said wrapping wire to the rods at every crossing point thereof. This securing has been done by welding, and by slotting the supporting rods transversely inserting the helically wound wire in the transverse slots and deforming the metal so as to cause it to grip the transverse slots, and in other ways. When the winding operation is terminated there is left a series of rod ends extending beyond the finally formed screen surface. It is necessary to secure on the ends of the screens, fittings ordinarily embodying male and female threaded portions respectively whereby sections of the screen may be united together or united to pipe sections with which the screen is adapted to coact.

It is a principal object of my invention to provide a method whereby fittings are provided with a special construction such that the rod ends are so positioned in relation to the fitting that the rod ends may, in effect, be welded to the fitting or be welded to parts immovably bound to the fitting.

It is a further object of my invention to provide a method of uniting the fittings or couplings of well screens to the supporting rods of a well screen wherein the screening surface is formed of a wrapping of wire, by providing fittings or couplings having a helical groove through the outer surface thereof, providing a multiplicity of holes into said fitting which extend through the bottoms of said grooves, winding a wire in said grooves and progressively welding the wire to each of the rod ends contacted by it as the wire is wound.

The full objects and advantages of my invention will appear in connection with the detailed description thereof and the novel features by which the above noted advantageous results are obtained are particularly pointed out in the claims.

In the drawings illustrating an application of my invention in one form:

Fig. 1 is a plan view of apparatus employed in the practise of my process with some parts broken away and omitted.

Fig. 2 is a longitudinal sectional elevation view with some parts broken away and omitted showing the fitting positioned in the machine for attachment to the rod ends.

Fig. 3 is a sectional view of an end of the screen with the fitting or coupling attached by my method.

Fig. 4 is a fragmentary detail sectional view of parts such as shown in Fig. 2 showing how the method is applied to the manufacture of fittings or couplings with female or internal threading.

Fig. 5 is a side view of the block from which the fitting or coupling is made.

Fig. 6 shows partly in section, and with operating parts omitted, how the holes are drilled in the coupling block.

Fig. 7 is a longitudinal sectional view through a wall of the coupling block showing one of the holes in outline.

Fig. 8 is a sectional part diagrammatic view showing the manner of simultaneously cutting right hand and left hand threads on the fitting or coupler block.

Fig. 9 is a fragmentary view of such a block with some parts broken away and in section showing how the left hand groove is cut across the holes that have been drilled.

Fig. 10 is a sectional view taken on line 10—10 of Fig. 9.

Fig. 11 is a sectional view taken on line 11—11 of Fig. 9.

Fig. 12 is a side elevation view of a completed fitting or coupler member.

Fig. 13 is a side view of a completed screen member adapted to have the coupling applied thereto.

Fig. 14 is a side view of a portion of what is shown in Fig. 13 with the coupling member applied thereto.

Fig. 15 is an end sectional view showing different sections of the fitting or coupler member when the same has been welded to the extended ends of the longitudinal supporting rods.

As illustrated a coupling block 20 is provided with an inner cylindrical wall 21 with a beveled top rim 22, Fig. 7, and a thickened portion 23 offset by an annular ledge 24 from the thinner cylindrical portion 25. In the preparation of the coupling member as a step in my process the coupler block 20 is first secured by means of set screws 26 to a holder 27, Fig. 6, which holder and the block 20 are then secured upon a table 28 by means of a shaft 29 and nut 30, the shaft 29 embodying a shoulder 31 which engages the top of table 28. A multiplicity of drill members 32 spaced and positioned to form vertical holes 33 in the thickened portion 23 of the coupler block 20 are operated in a well known manner (not shown) simultaneously to drill all of the holes 33 to a suitable depth in the thickened member 23, as clearly shown in Fig. 7.

After the vertical holes are thus drilled the holder 27 is secured by means of shaft 34 and nut 35 upon a rotatable table 36, Fig. 8. Two thread cutters 37 and 38 are positioned to operate upon opposite ends of the coupler block 20. The thread cutter 37 cuts left hand threads along the outside of the thickened portion 23 from the outside end thereof toward its inner end, while at the same time the thread cutter 38 cuts right hand threads along the outside of the thinner portion 25 from its outer end toward the center of the coupler. The means for rotating the table 36 and for moving the cutters 37 and 38 in opposite directions are standard and hence are not shown.

As a result of this operation the coupler block 20 has a left hand thread 39 cut down its outside from the upper end. The base of thread 39 extends to points below the margins of holes 33 so the spaces 49 between threads 39 extend into the spaces of holes 33. In practise the well screen 41, Fig. 13, is formed of a multiplicity of supporting rods 42 preferably substantially triangular in shape, as shown in Fig. 15, upon which is wound helically a wrapping wire 43 also of substantially triangular shape, as clearly shown in Fig. 2, which, by well known means not shown, has its narrowed portion welded to the narrowed portions of the supporting rods 42. The spaces 44 between successive helical coils provide the drainage slots to the interior of the screen. The spaces 49 between threads 39, as clearly shown in Fig. 2, have substantially the cross sectional area of the wrapping wire 43 so when a wire of similar cross section to the wrapping wire is laid in the groove 49 it will substantially fill it, and of course, since the groove space 49 extends into the space of holes 33 a wire such as wire 43 would extend into the same space, or, when there are ends of rod 42 therein, would extend to contact the sides of said rod ends.

At the same time that the groove 49 is being formed by cutter 37 right hand threads 45 are formed on the narrowed portion 25 of coupler block 20. This completes the coupler block, as shown in Fig. 12, ready to be applied to the otherwise completed well screen 41.

In practice it is customary to lay the helical coils formed by wrapping wire 43 closer together at the ends, as indicated at 46 of Fig. 13. Also there will be left rod ends 47 extending outwardly from termination of the wrapping, as clearly shown in Fig. 13. In completing the well screen, as shown in Fig. 13, the completed fittings, as in Fig. 12, are applied to the rod ends 47 of the fabricated well screen 41, as clearly shown in Fig. 14. This assemblage is then introduced into the welding and wrapping mechanism shown in Figs. 1 and 2. This machine comprises a main frame support 50 to which is secured by means of a bolt 51 a drum 52 having formed thereon external left hand threading 53. A second drum 54 has formed thereon internal left hand threading 55 and is adapted to be threaded on to drum 52, as clearly shown in Fig. 2. The drum 54 has formed thereon elongated gear teeth 56 and has a portion 57 extended from the part carrying the threading 55 and gear teeth 56 which is provided with internal right hand threading 58 where the male coupling member is to be applied, as shown in Fig. 2, and external right hand threading 59 for the female form of coupling, as shown in Fig. 4. In practice the male coupling member 20 (or the female coupling member 60) will be applied to the drum 54 first and then the well screen 41 will have its extended ends 47 of rods 42 inserted in holes 33. A wrapping wire 61, Fig. 1, similar in cross section to wrapping wire 43 is laid into the beginning of the thread groove 49 against the termination at 63, Fig. 13, of wrapping wire 43 and tacked in that position where it comes under a weighted welding disc 64. The wire 61 is straightened and guided by a series of guide rollers 65. The welding disc 64 is carried on a pivoted arm 66 and a weighted roller 67 is carried on a pivoted arm 68.

Current is supplied from a transformer 69 through a wire 70 to the welding disc 64 and it goes back to the transformer through wire 71. There is thus a gap 72 between disc 64 and compressor 67 which connects with wire 71. It follows that as the wire 61 is laid in the thread groove 39 contacting the exposed edge 73 of rod 42 the contacting wire and rod become the main conductor of current across said gap 72. This results in softening and sinking together of the successive contacting portions of wire 61 and rods 42, while the weight roller 67 riding upon a multiplicity of tops of coils of wire 43 prevents the welding action operating to carry the wire 61 down further than just to fill the thread grooves 49. The operation of these parts is effected by a motor 74 which through belt 75 and pulley 76 drives a shaft 77. A slide on said shaft, not shown in detail, is operated by a lever 78 pivoted at 79 to a bracket 80. In one direction the movement of the lever and slide operates a clutch 81 and when moved in the other direction it operates a stopping and braking mechanism 82.

The parts are driven by a train of gearing 83 of which gear 84 meshes with the long teeth 56 on drum 54. As this drum is rotated it simultaneously causes wire 61 to be laid in thread grooves 49 against exposed edges 73 of rods 42, so that welding action takes place at successive crossings thereof, and through the operation of left hand threads 53 and 55, causes drum 54 and the parts carried thereby to move away from drum 52 and support 50 at exactly the same rate of horizontal movement as is required to lay the wire 61 in the helical thread groove 49.

The advantages of my invention have been made to appear quite fully in the foregoing description. A principal advantage and one of the highest importance is that the fittings comprising the coupling members by which the well screen has sections thereof united together or a section united to a pipe are integrally and directly secured to the longitudinal rods forming the support for the wrapping wire. This being true, all strains of every sort and kind imposed upon the screen as a whole are transmitted directly to the coupling from the supporting rods and are taken away from the wrapping wire. As this is a deep well screen such relieving of strains is a matter of great importance.

There is a further great advantage in my method of uniting the screen member to the couplings in that the main body of the coupling has its cylindrical surface in the cylindrical plane of the cylinder proper so that when sections of the well screen are united together or the well screen is united to the pipe there is an unobstructed, continuous and uniform cylindrical surface presenting no obstructions to the forcing downward of the screen and the pipe to which it is attached.

I claim:

1. A method of attaching couplings to well screens which consists in forming a screen surface over a multiplicity of longitudinal elements held to outline a cylinder, and having end portions extending outwardly at each end of the screen surface, forming end fittings for said screen embodying a coupler block, forming a multiplicity of longitudinally extended holes in said coupler block, and forming a helical thread-groove on the outside of said coupler block, said groove extending into said holes at each crossing point thereof, applying the screen to the coupler block with the aforesaid exposed ends within said holes, wrapping a wire in the thread-groove and progressively welding said wire to the successive element ends at each crossing point of the wire therewith.

2. A method of attaching couplings to well screens which consists in forming a screen surface over a multiplicity of longitudinal elements held to outline a cylinder, and having end portions extending outwardly at each end of the screen surface, forming end fittings for said screen embodying a coupler block, forming a multiplicity of longitudinally extended holes in said coupler block, and forming a helical thread-groove on the outside of said coupler block, said groove extending into said holes at each crossing point thereof, applying the screen to the coupler block with the aforesaid exposed ends within said holes, wrapping a wire in the thread-groove and progressively welding said wire to the successive element ends at each crossing point of the wire therewith, and causing said contacting portions of said wire at every crossing point of contact with the supporting elements to be sunk therein predetermined distances so as to bring the outer surface of the wire into the plane of the screen surface.

3. A method of attaching couplings to well screens which consists in forming a screen surface over a multiplicity of longitudinal elements held to outline a cylinder, and having end portions extending outwardly at each end of the screen surface, forming end fittings for said screen embodying a coupler block, forming a multiplicity of longitudinally extended holes in said coupler block, and forming a helical thread-groove on the outside of said coupler block, said groove extending into said holes at each crossing point thereof, applying the screen to the coupler block with the aforesaid exposed ends within said holes, simultaneously rotating the coupler block and attached screen and moving them longitudinally to wrap a wire in the thread-groove, and causing welding current to pass through said wire and longitudinal elements to weld the same together at each of their crossing points.

4. A method of attaching couplings to well screens, wherein the screen consists of a multiplicity of longitudinal and helical elements welded together to form a screen cylinder with end portions of the longitudinal elements extending outwardly, which consists in forming male and female coupling members each with a raised annular portion adapted when screwed together to form a continuous cylindrical surface with no protruding parts, forming longitudinal holes in said raised portions adapted to receive the protruding ends of the longitudinal screen supports, forming a helical groove in said thickened portions extending into the said openings, laying a helical wire in said grooves to engage sides of the protruding ends, and welding the wire to the sides of said protruding ends and to the sides of the grooves.

ALBERT A. JENS.